E. LYTTON.
FILM AND LIKE REEL MECHANISM.
APPLICATION FILED OCT. 11, 1913.
1,132,369.
Patented Mar. 16, 1915.
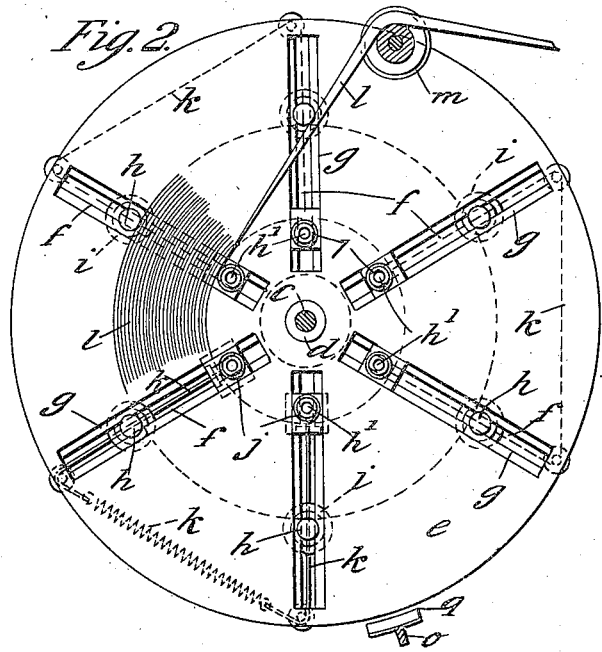
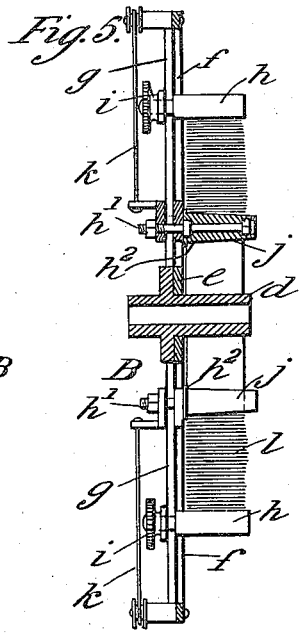
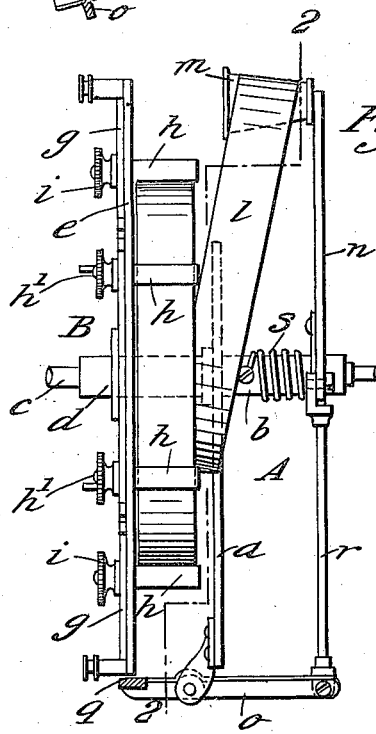
Witnesses
Inventor
Edward Lytton,
by
James L. Norris,
Attorney.

E. LYTTON.
FILM AND LIKE REEL MECHANISM.
APPLICATION FILED OCT. 11, 1913.
1,132,369.
Patented Mar. 16, 1915.
2 SHEETS—SHEET 2.
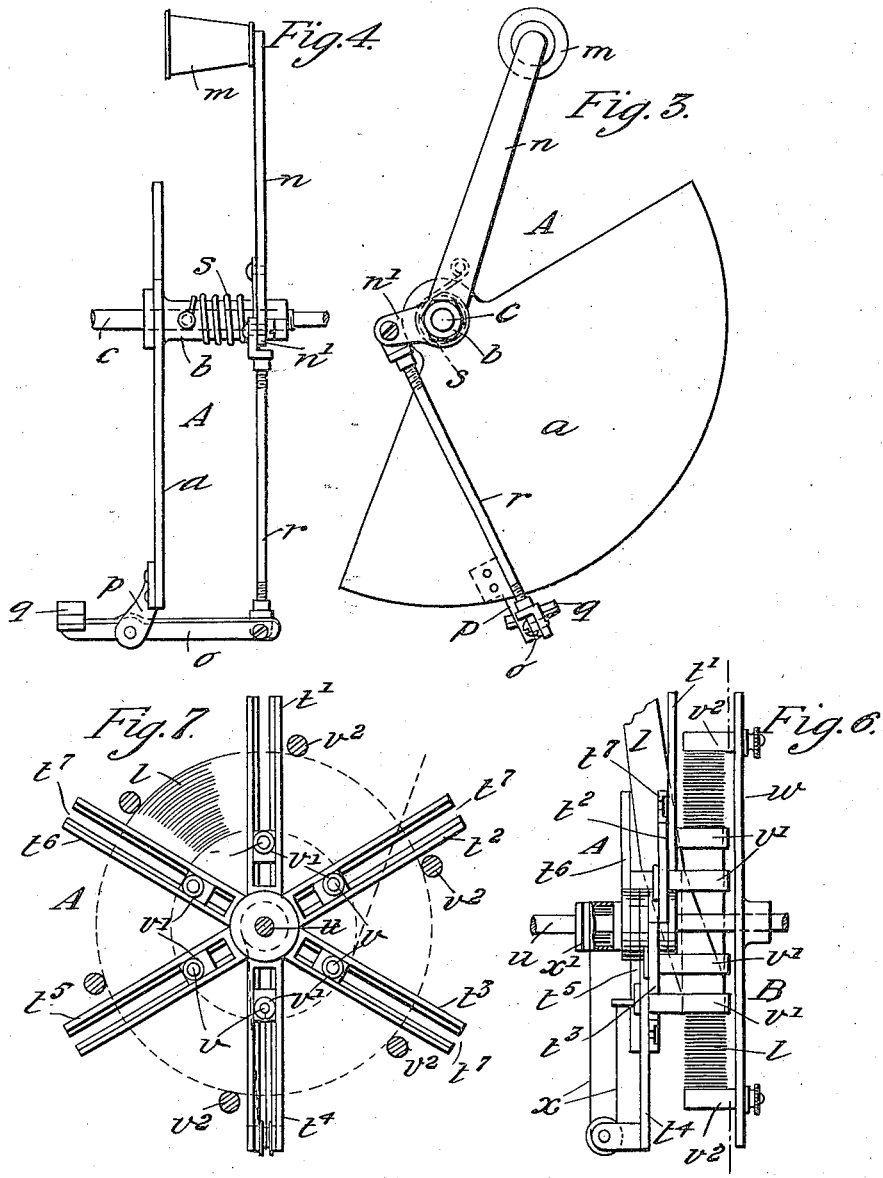
Witnesses
Inventor
Edward Lytton,
by James L. Norris
Attorney.

UNITED STATES PATENT OFFICE.

EDWARD LYTTON, OF LONDON, ENGLAND.

FILM AND LIKE REEL MECHANISM.

1,132,369.

Specification of Letters Patent.

Patented Mar. 16, 1915.

Application filed October 11, 1913. Serial No. 794,652.

*To all whom it may concern:*

Be it known that I, EDWARD LYTTON, a subject of the King of Great Britain, residing in London, England, and whose post-office address is The Prince of Wales Theatre, Coventry street, in the county of London, England, have invented certain new and useful Improvements in Film and like Reel Mechanisms, of which the following is a specification.

This invention relates to mechanism for spirally winding and unwinding rolls or strips of material, cinematograph films and the like of the type in which the film is wound upon a spool from the outside or periphery inward to the center or unwound in the opposite direction and it consists in improvements designed to obviate the risk of entanglement or damage to the film and generally to secure a more perfect operation of the apparatus and also to provide, where desirable, means whereby the motion of a roll carrying member may be automatically braked or arrested should the material constituting a roll break during unwinding operation, or should the machine stop from any cause.

The invention will be described, for example, as applied to spools used for the winding and unwinding of cinematograph films, and with reference to the accompanying drawings, in which:—

Figure 1 is a side elevation (with parts omitted and a portion in section) of a winding mechanism comprising a two member spool constructed according to this invention; Fig. 2 is a section on line 2, 2 Fig. 1; Figs. 3 and 4 an end and side view respectively of one of the spool members; Fig. 5 a section of the other spool member; Fig. 6 a side view, with part in section of a modified form of two-member spool, and Fig. 7 an end view of one of the members of the spool shown in Fig. 6.

In order that a film, that has been exposed in a cinematograph apparatus and wound in the ordinary way onto a spool, may be ready for immediate use again on the same or another apparatus without its being re-wound as is the custom now, the spool on which the film is wound immediately after exposure is formed with one side or cheek removable so as to allow the wound film to be slipped from off the spool core. The rolled film thus removed can then be placed upon an unwinding spool device constructed according to this invention. This device comprises two parts A and B, one of which is fixed on a cinematograph or other apparatus while the other part is capable of being removably and rotatably mounted on the fixed part. The removable part may be interchangeable with fellow fixed parts on any number of apparatus.

Referring first to the form of spool illustrated in Figs. 1-5, the fixed part A of the spool comprises a plate $a$ of sector or other suitable shape integral with or secured to a hub $b$. In the hub is fixed a spindle $c$ for coöperation with a sleeve or socket $d$ carried by the removable part B of the spool. The removable part consists of a plate or disk $e$ having the socket $d$ projecting at right angles thereto. In the plate are a series of radially disposed slots $f$ with or without coöperating guide or retaining pieces $g$. In each slot or guide piece is a pair of slidably mounted pins or arms $h$, $h'$, which when the movable part of the spool is coöperatively mounted on a fixed spool part project in a normal direction toward the fixed plate as shown in Fig. 1. It will be seen that the several arms or pins $h$ constitute an outer series of pins and the arms or pins $h'$, which are arranged nearer to the hub $d$ than the pins $h$, form a second or inner series. Alternatively the arms $h$, $h'$ constituting a pair may be mounted in separate slots instead of both being in one slot. One arm $h$ of each pair is provided with means, such as a clamping screw $i$, for clamping it in any desired position along its slot or guideway while the other arm $h'$, which is positioned with respect to the center or axis of the plate nearer than its fellow arm $h$, is free to move and carries a roller or sleeve $j$ which is preferably slightly coned, and may be provided with a lip $h^2$ to serve as a support for one or more convolutions of the film. The inner arms $h'$ are provided with suitable means whereby they tend normally to slide outwardly toward the circumference of the spool plate $a$. Such means may comprise spring or elastic members $k$ passing around pulleys and secured for example by their ends to the arms $h'$ or a part carried by them and to plate $a$, or as shown in Figs. 2 and 5 each member $k$ may have its ends connected to separate arms $h'$; or the movement of the arm $h'$ may be controlled by cords and pulleys actuated by a spring driven drum, as shown in the case of the modified spool depicted in Fig. 6; or the arms may be shifted both outwardly from and inwardly toward the center by similar means.

The outer arms $h$ are adjusted and fixed at radial distances from the axis of the spool plate that correspond with the outer circumference or convolution of the rolled film that is to be placed on the spool plate for the purpose of being unrolled. When the outer arms have been set to suit the film that has been previously wound on and removed from an ordinary spool with removable cheek, and the inner arms have been retracted inwardly toward the center of the spool plate against the action of the springs or other actuating devices, and held there by hand or suitable means, such as an elastic ring, the film $l$ can then be readily placed against the spool plate with its outer circumference bearing against the outer arms $h$, which serve to guide and retain the film in proper position. On the inner arms being released from their retracted position they will slide into engagement with and support the wound film, gripping the inner circumference thereof. The movable part B of the spool, together with the film, is now ready to be mounted on the spindle $c$ of a coöperating spool part A fixed on any apparatus. When so mounted, the inner or commencing end of the film, which was the first to be wound onto the ordinary spool in the first instance, is led from the center of the roll over a coned guide pulley $m$ carried by an arm of a lever $n$ rotatably mounted on the spindle $c$ or hub $d$ of the fixed portion A of the spool. After passing over the guide pulley the end of the film is threaded through and attached to the film drawing mechanism or device of the cinematograph apparatus in which the film is to be exposed. The tension imparted to the film by the drawing mechanism causes the movable part B of the spool to rotate on the spindle $c$ of the associated fixed part A, the film meanwhile easily slipping in succession off the rollers $j$ carried by the inner arms. As the film is thus unwound and the convolutions decrease in number, the inner arms $h'$ will gradually slide outward and be kept in engagement with the innermost convolution so that all risk of entanglement is obviated.

The guide pulley lever $n$ may have a second arm $n'$ which may be employed for actuating mechanism for braking or arresting the motion of the rotating spool plate in the event of the machine stopping for any reason or of the film breaking while it is being unwound. This mechanism comprises a lever $o$ pivotally mounted by means of bracket $p$ on the fixed plate $a$ and carrying at one end a brake-shoe $q$ adapted to engage the periphery or other part of, or a part connected with, the rotatable plate $e$ when mounted on the fixed spool part. At its other end the brake lever is adjustably connected by a rod $r$ to the second arm $n'$ of the guide pulley lever. The guide pulley lever is held by the film in retracted or operative position against the action of a coil spring $s$ connected at its ends with the lever and the hub of the fixed plate. As long as the lever $n$ is so held, the arm $n'$ acting through rod $r$ will hold the brake shoe $q$ out of engagement with plate $e$, but should the film break, the guide pulley lever under the action of the coil spring $s$ is turned from the operative position, which movement is transmitted through arm $n'$ and rod $r$ to the brake lever $o$ which is in consequence turned in a manner that the brake shoe thereon is pressed into engagement with the rotating plate so as to brake and arrest its motion.

In the modified form of the improved spool shown in Figs. 6 and 7, the part to which a wound roll is applied is stationary, while the other part, in this case a plate or disk, is adapted to be rotated by suitable means. The stationary part A of the spool in this form, consists of a number of radial spoke-like members $t'$, $t^2$ ... $t^6$. The hubs of the spokes are threaded in superposed relation on to a fixed spindle $u$ and in a manner that the spokes themselves lie around the spindle each in a different plane, as shown in Fig. 6. The spokes are slotted and in each slot $t^7$ is slidably mounted, with or without additional guide and retaining pieces (none are shown in Figs. 6 and 7) an arm or pin $v$ carrying a roller sleeve $v'$, and also an arm $v^2$ that can be adjustably clamped in position and is similar to arms $h$ in Figs. 1–5. The arms $v$ under the action of springs or other means as above described, or, as shown in Fig. 6, of the cords $x$ and spring drum $x'$, tend normally to slide, from the spindle toward the outer ends of the spokes. The arms $v$ and associated sleeves $v'$ will be of varying length, in order that their free ends will be equally near the rotatable disk $w$ that is to coöperate with and be mounted on the spindle of the stationary part of the spool. To apply a wound roll or film to the stationary part of the spool, the arms $v$ are drawn toward the spindle so that they can enter the space inclosed by the innermost convolution of a roll placed around them. On the arms being released they will slide outward into engagement with the said innermost convolution the roll contacting with or resting against one of the radiating spokes. When the roll or film has been applied to the stationary part A of the spool, the rotatable disk or plate $w$ is mounted on the spindle of the stationary part. The inner end of the film drawn out from the center to the periphery of the spool is led to the guiding and feeding mechanism of the cinematograph apparatus.

As the film is drawn by the feeding mechanism the unwound portion of the film roll carried by the part A is able as it unwinds to rotate by itself around the outwardly pressed rollers $v'$ on the arms $v$. This rotation of the wound film, however, is facilitated if the coöperating disk $w$, which is arranged to engage the sides of the film roll, be simultaneously rotated.

As the film travels outwardly from the center in the direction of the periphery of plate $w$, it takes a course inclined with respect to the axis of the film roll, as indicated in Fig. 6, a course that is rendered possible by the spokes being arranged as stated above in different planes.

The improved spool, in either form of construction may be used not merely for unwinding purposes but also for winding a film spirally inward from the circumference, that is to say the outermost convolution, which, when the spool in Figs. 1–5 is used, will be in engagement with and be retained by the outer series of arms or pins $h$, will be the first convolution to be wound in forming a roll. When the spools described herein are used for winding purposes it is preferable to fit same with suitable means for guiding the film as it enters the spool.

Having now described the nature of my said invention and the best means I know of carrying the same into practical effect, I claim:—

1. In a film or strip winding mechanism of the type described, a spool comprising in combination a rotatable carrier, an outer and an inner series of movable arms mounted on the carrier, said arms adapted to hold the roll of film or strip material upon the spool and maintain its convolutions in engagement until it is completely unwound.

2. In a film or strip winding mechanism of the type described, a spool comprising in combination a rotatable carrier, a series of adjustable arms mounted on the carrier, said arms adapted to engage the outer circumference of the roll of film or strip material to hold it in position in the spool, and of a second series of arms or pins continuously urged against the inner circumference of said roll of material to retain the convolutions of the roll in engagement until the material is completely unwound.

3. In a film or strip winding mechanism of the type described, a spool comprising in combination a rotating carrier, a series of adjustable arms mounted thereon and adapted to engage one circumference of the roll of film or strip material on the spool, a second series of continuously urged stops adapted to engage the other circumference of said roll, means permitting the material as unwound to take a course inclined to the plane of the spool and adapted to guide said inclined portion into the machine.

4. In a film or strip winding mechanism of the type described, a spool comprising in combination a rotatable part having an outer and an inner series of movable arms thereon to hold the roll of material and a fixed part upon which the rotatable part may be removably mounted to rotate, substantially as hereinbefore described.

5. In a film or strip winding mechanism of the type described, a spool comprising in combination a rotatable part having two series of movable arms thereon to hold the roll of material, a fixed part upon which the rotatable part may be removably mounted to rotate and means carried by said fixed part automatically operating on the rupture of the unwound portion of the roll or on the stopping of the machine to brake the rotatable part and arrest its motion, substantially as hereinbefore described.

In testimony whereof I have signed my name to this specification in the presence of two subscribing witnesses.

EDWARD LYTTON.

Witnesses:
JOSEPH MILLARD,
WALTER J. SKERTEN.